US006941357B2

(12) United States Patent
Nguyen et al.

(10) Patent No.: US 6,941,357 B2
(45) Date of Patent: Sep. 6, 2005

(54) FIBRE CHANNEL SWITCHING APPLIANCE

(75) Inventors: Nam Van Nguyen, Round Rock, TX (US); Edward Yardumian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 743 days.

(21) Appl. No.: 09/908,397

(22) Filed: Jul. 18, 2001

(65) Prior Publication Data

US 2003/0018756 A1 Jan. 23, 2003

(51) Int. Cl.$^7$ .............................................. G06F 15/177
(52) U.S. Cl. ..................................... 709/220; 709/222
(58) Field of Search ........................ 709/220, 222–226; 370/254; 715/734, 735

(56) References Cited

U.S. PATENT DOCUMENTS

| | | | | |
|---|---|---|---|---|
| 5,694,615 | A | 12/1997 | Thapar et al. | 395/822 |
| 5,926,625 | A | 7/1999 | Corlett et al. | 395/200.51 |
| 5,978,379 | A | 11/1999 | Chan et al. | 370/403 |
| 6,160,813 | A | 12/2000 | Banks et al. | 370/422 |
| 6,192,054 | B1 | 2/2001 | Chan et al. | 370/452 |
| 6,751,702 | B1 * | 6/2004 | Hsieh et al. | 711/112 |
| 6,765,919 | B1 * | 7/2004 | Banks et al. | 370/401 |
| 2004/0078599 | A1 * | 4/2004 | Nahum | 713/201 |

FOREIGN PATENT DOCUMENTS

| | | | |
|---|---|---|---|
| WO | WO 00/55750 | 9/2000 | G06F/15/173 |

OTHER PUBLICATIONS

U.S. Appl. No. 60/105,423, filed Oct. 23, 1998, Banks et al.*
U.S. Appl. No. 60/234,171, filed Sep. 20, 2000, Ambe et al.*
Brocade Zoning—A service for extra control of the SAN, Pub. Date 1998.*
Brocade Silkworm 2400 and 2800 Enterprise Fibre Channel Switches– Silkworm Switch Family, Pub. date 2000.*
Brocade Web Tools User's Guide v2.3 Pub. 2000.*
Brocade Silkworm 2400 Hardware Reference Manual, pub. 1999.*
Pending U.S Appl. No. 09/524,401 entitled "*System and Method for Managing Storage Resources in a Clustered Computing Environment*" filed by Tawil et al. and assigned to Dell Products, L.P, filed Mar. 9, 2000.
U.S. Appl. No. 09/633,449 entitled "*Cable Management Arm Assembly*" filed by Gray et al. and assigned to Dell Products, L.P, filed Aug. 7, 2000.

* cited by examiner

*Primary Examiner*—Jeffrey Gaffin
*Assistant Examiner*—David Martinez
(74) *Attorney, Agent, or Firm*—Baker Botts L.L.P.

(57) ABSTRACT

A system, method and apparatus for network computing are disclosed. According to teachings of the present disclosure, a switching appliance having redundant Fibre Channel switches and redundant power supplies is provided. Also included on the switching appliance is a user selection mechanism allowing a user to port-zone each of the switches by selecting one of a plurality of pre-programmed port-zoning configurations. The switching appliance may be further configured to indicate cabling connections to be made between the ports of the switching appliance and a plurality of computing components.

28 Claims, 2 Drawing Sheets

FIBRE CHANNEL SWITCHING APPLIANCE

TECHNICAL FIELD

The present invention relates generally to computer networking and, more particularly, to an appliance for simplifying complex storage networking configurations.

BACKGROUND

Storage area networks (SANs) offer greater configuration flexibility, expandability and overall availability than their SCSI (Small Computer Systems Interface) counterparts. While many large organizations have adopted SANs, many smaller organizations continue to purchase SCSI systems. Among the reasons for the continued selection of SCSI over SAN solutions are the extensive cost and greater complexity of SAN installations and maintenance.

SAN implementations can be complex and costly because SANs generally require Fibre Channel networking through hubs or switches. Similar SCSI implementations, on the other hand, use generally well-settled technology that is typically inexpensive. Retailers of SAN systems and components face additional support challenges because of the more advanced nature of the technology and because of the flexibility of SANs combined with customer unfamiliarity. These potential customer support issues inevitably end up increasing the overall costs of SAN implementations.

Commonly available Fibre Channel switches come in eight (8), sixteen (16) and twenty-four (24) port configurations. Fibre Channel switches under development include versions having thirty-two (32) or more ports. For users requiring large-scale SAN implementations, these commonly available switches are suitable. However, for users wishing to implement basic failover cluster SAN configurations as well as simple storage and cluster consolidation, these commonly available switches constitute a significant investment and a potential barrier to widespread SAN implementation.

Some vendors have attempted to overcome the objections to SAN implementations by offering low-cost hubs for low-end configurations. Hubs generally offer ease of use and have cabling concerns as their only additional complexity. However, hubs do not generally offer the same performance and scalability that is offered by Fibre Channel switches. Consequently, users requiring more advanced networking configurations generally must replace their hub-based solutions.

Other propositions offered to overcome the objections to SAN implementations include reducing the number of ports available on switches, eliminating the redundant power available in many switch configurations and using port-zoning to divide a single switch into two halves to support redundant communication paths. While some advantages may be achieved through such propositions, no allowances for a reduction in complexity or an elimination of single points of failure have been made. Therefore, SAN implementations are still likely to take a backseat to simpler, cheaper SCSI solutions.

SUMMARY

In accordance with teachings of the present disclosure, a networking device having a plurality of pre-programmed port-zoning configurations available for user selection is provided. The networking device preferably includes two switch modules, each switch module preferably including a plurality of ports operable to couple together a plurality of computing components. The networking device also preferably includes two power supplies operably coupled to each switch module and a user selection mechanism preferably coupled to the switch modules. In one aspect, the user selection mechanism may be used to configure the plurality of ports into one of at least two pre-programmed port-zoning configurations.

In another aspect, a method for communicatively coupling a plurality of computing components is provided. The method preferably includes maintaining at least two switch modules, each switch module having a plurality of ports operable to communicatively couple together a plurality of computing components. The method preferably further includes maintaining a program of instructions operable to configure the plurality of ports into one of at least two port-zoning configurations. The method also preferably includes use of a user selection mechanism operable to select one of at least two port-zoning configurations. The user selection mechanism may also be used to initiate the program of instructions according to the selected port-zoning configuration in the method.

In a further aspect, a computing system having a switching appliance preferably coupled to a plurality of computing components is provided. In the computing system, the switching appliance preferably includes a plurality of switch modules, a power source operably coupled to the switch modules, and a plurality of ports operably coupled to the switch modules and the plurality of computing components. Also preferably included in the switching appliance is at least one processor, at least one memory and a program of instructions executable in the processor and storable in the memory. The program of instructions is preferably operable to configure the plurality of ports according to a user selected port-zoning configuration selected from a plurality of pre-programmed port-zoning configurations. The port-zoning configuration may be selected by the user with a user selection mechanism preferably coupled to the switch modules.

In one aspect, the present disclosure provides the technical advantages of reducing the costs of switching hardware and technical support for such switching hardware while improving the user experience.

The present disclosure provides a low-cost, user-friendly switching appliance capable of providing users with greater network and computing asset configuration flexibility, expandability, and overall availability.

Teachings of the present disclosure provide advantages over alternative technologies through performance and scalability allowing users to readily pursue more advanced network configurations.

In another aspect, the present disclosure provides a switching appliance which reduces installation and maintenance complexities as well as minimizes single points of failure.

An additional technical advantage provided by teachings of the present disclosure is the ability to port-zone a switching appliance without the benefit of software tools which may not be available for all operating systems, well understood by the customer, and may induce the potentiality for misconfiguration and error.

As taught by the present disclosure, the ability to make port-zoning configuration selections from a user selection mechanism improves switching appliance ease of use and reduces user dependency on software configuration tools.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
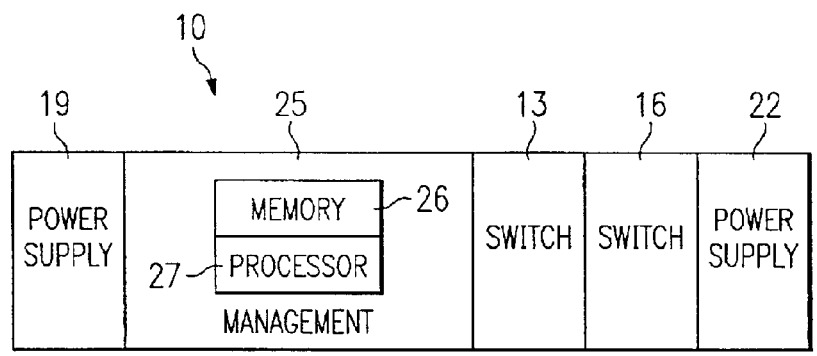
FIG. 1 illustrates a schematic drawing showing one embodiment of a switching appliance implemented in a 1U, rack optimized chassis according to teachings of the present disclosure.
Figure 2:
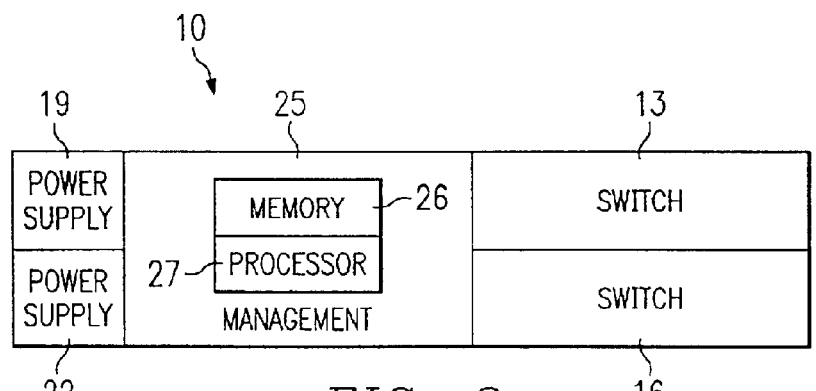
FIG. 2 illustrates a schematic drawing showing one embodiment of a switching appliance implemented in a 2U chassis according to teachings of the present disclosure.

Referring first to FIGS. 1 and 2, schematic drawings illustrating an embodiment of a switching appliance incorporating teachings of the present disclosure implemented in both a 1U chassis, FIG. 1, and a 2U chassis, FIG. 2, are shown. According to the EIA (Electronics Industry Association), rack-mounted computing components should be contained in a chassis (illustrated generally in FIG. 4) having height dimensions measured in multiples of Us, where each U measures approximately one and three-quarters inches (1.75").

As illustrated in FIGS. 1 and 2, switching appliance 10 preferably includes switch module 13 and switch module 16. According to teachings of the present disclosure, switch module 13 and switch module 16 are preferably electronically and functionally isolated from one another. As such, in the event an individual switch module suffers a malfunction, the remaining switch module should remain unaffected. Further, in the event one switch module fails, the remaining switch module is preferably operable to assume the operations, communications, etc., performed by the failing switch module. Accordingly, switching appliance 10 will likely have increased availability due to the incorporation of redundant switch modules 13 and 16. In alternate aspects of the present disclosure, switching appliance 3 may include more than two switch modules.

In one aspect, switch modules 13 and 16 are preferably based on Fibre Channel technology. Fibre Channel technology is generally defined as a highly reliable, gigabit interconnect technology allowing concurrent communications among workstations, mainframes, servers, data storage systems and other peripherals using such protocols as SCSI and IP (Internet Protocol).

Fibre Channel architecture generally represents a true channel/network integration with an active, intelligent interconnection among devices. Generally, all a Fibre Channel port (illustrated in FIG. 4) has to do is manage a single point-to-point connection. In Fibre Channel communications, transmissions are generally isolated from the control protocol, so point-to-point, arbitrated loops and switched topologies may be used to meet the specific needs of a given application. The fabric of Fibre Channel technology is generally self-managing and nodes generally do not require station management.

Fibre Channel switches, such as switch modules 13 and 16, generally provide scalable systems of almost any size. In general, a switch is a network device that selects a path or circuit for sending a unit of data to its next destination. Switches are generally capable of forwarding data, signals, packets, etc., directly to the ports associated with a particular network address or device. Fibre Channel switches are switches whose functionality is controlled by Fibre Channel technology.

In addition to switch modules 13 and 16, switching appliance 10 preferably includes power supply 19 and power supply 22. Similar to switch modules 13 and 16, power supplies 19 and 22 are preferably electrically and functionally isolated from one another. In another embodiment, the power source provided with switch modules 13 and 16 may include a power supply paralleling backplane (not expressly shown). A power supply paralleling backplane is preferably operable to provide high-availability power to computing parts or components coupled thereto.

To further increase system availability, switch modules 13 and 16 as well as power supplies 19 and 22 are preferably hot-pluggable or hot-swappable. By providing hot-pluggable components, a system employing switching appliance 10 can remain in operation while a failing switch module or power supply is replaced, all while the system remains operational. In addition, this ensures that the approach of using multiple switches within the same enclosure is not a liability in terms of system availability.

Power supply 19 and power supply 22 are each preferably operable to supply electrical power to switch module 13 and switch module 16 concurrently. As such, each power supply may serve as a redundant or backup power supply for a failing power supply such that the failure of one power supply will generally not affect the operability or functionality of switching appliance 10. Incorporating redundant power supplies in addition to redundant switches into switching appliance 10 is likely to provide switching appliance 10 with overall increased availability.

One of the benefits of Fibre Channel switching technology, zoning, is also one of the technology's roadblocks to its widespread use. In one aspect, for example, zoning allows multiple server systems or clusters (illustrated in FIG. 4) to share the use of a switch connected to one or more storage systems (illustrated in FIG. 4). In such a configuration, each zone may be isolated from the remaining zones, generally preventing the computing components in each zone from interfering with the operations of the computing components in the remaining zones. Consequently, zones are similar to vLANs (virtual Local Area Networks). Zoning is discussed in greater detail below.

According to teachings of the present disclosure, roadblocks to widespread Fibre Channel and SAN usage are the implementation, maintenance and other complexities associated with each. In part to overcome these and other implementation and maintenance complexity issues, switching appliance 10 preferably includes management module 25.

In one aspect of the present disclosure, management module 25 preferably enables users of switching appliance 10 to configure and reconfigure switch module 13 and switch module 16 into any one of an available plurality of port-zoned configurations. In one embodiment of management module 25, a program of instructions may be stored in memory 26 of switching appliance 10. Upon selection of a port-zoned configuration, the program of instructions may be executed by processor 27 preferably coupled to memory 26. The program of instructions is preferably operable to configure a plurality of ports (illustrated in FIG. 4) included on switch module 13 and switch module 16 into one or more zones according to a port-zoning configuration selected by a user from the available plurality of port-zoning configurations.

In an alternate aspect, the functionalities preferably included in management module 25 may be hardwired into switching appliance 10. Further, both switch module 13 and switch module 16 may include a management module 25 operably associated with each. In such an embodiment, each management module 25 is preferably operable to perform redundancy functions for the other.

In addition to making hardware assignments within switching appliance 10 to configure the ports according to the selected port-zoning configuration, the program of instructions may also be operable to aid with cabling connections (illustrated in FIG. 4) to be made between various computing components and switching appliance 10. Cabling connection aid may be in the form of static cabling connection maps illustrating the appropriate cabling connections or, illuminating one or more LEDs (light emitting diodes) associated with the ports according to the ports' respective zone assignments. As an alternative to cabling connections, one or more wireless technologies, such as Bluetooth, IEEE 802.15 (wireless personal area network protocol) as well as others may also be employed to communicatively couple switching appliance 10 to a plurality of computing components.

In one aspect of the present disclosure, switch module 13 and switch module 16 may be redundant, eight-port (8-port) Fibre Channel switches. A plurality of port-zoning configurations may be supported by dual eight-port switch modules. For example, switching appliance 10 may be configured such that a user may select from four (4) different port-zoned configurations. Available port-zoning configurations in such an arrangement include, but are not limited to, no zoning, two (2) disjoint zones, two (2) overlapping zones and three (3) overlapping zones. Other port-zoning configuration selections are possible with dual eight-port switches as well as with switches having more than or less than eight ports. The configurations selectable will preferably be the most commonly used configurations.

Figure 3:
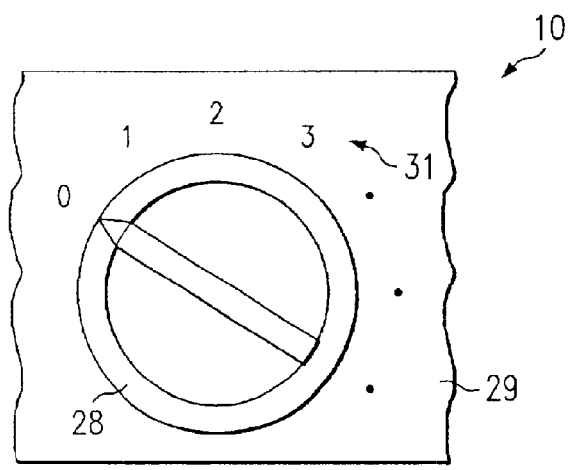
FIG. 3 illustrates a schematic drawing with portions broken away showing one embodiment of a switching appliance user selection mechanism according to teachings of the present disclosure.

In FIG. 3, a schematic drawing with portions broken away illustrating one embodiment of a switching appliance user selection mechanism according to teachings of the present disclosure is shown. As illustrated in FIG. 3, user selection mechanism 28 is in the form of a dial. Alternative forms of user selection mechanisms 28 such as a series of selectable buttons, levers, etc., may also be employed without departing from the spirit, scope and teachings of the present disclosure.

User selection mechanism 28 is preferably mounted on front bezel 29 of switching appliance 10. In use, user selection mechanism 28 may be rotated to select one of the plurality of port-zoning configurations made available through management module 25. The port-zoning configurations available may be identified as depicted generally at 31 in FIG. 10 or by similar markings.

In one aspect of the present disclosure, user selection mechanism 28 allows a user to select a port-zoning configuration from a plurality of port-zoning configurations available from management module 25. In a further aspect, user selection mechanism 28 may also be configured as a port-zoning configuration confirmation mechanism. For example, upon selection of a desired port-zoning configuration with user selection mechanism 28, user selection mechanism 28 may be configured such that the user is required to depress and hold user selection mechanism 28 to confirm the selected port-zoning configuration and to subsequently initiate management module 25 to begin the process of zoning the various ports of switch module 13 and switch module 16. Alternatively, a separate button, dial, lever or similar device may be incorporated onto switching appliance 10 to serve as and perform the duties and tasks of a port-zoning configuration confirmation mechanism.

Figure 4:
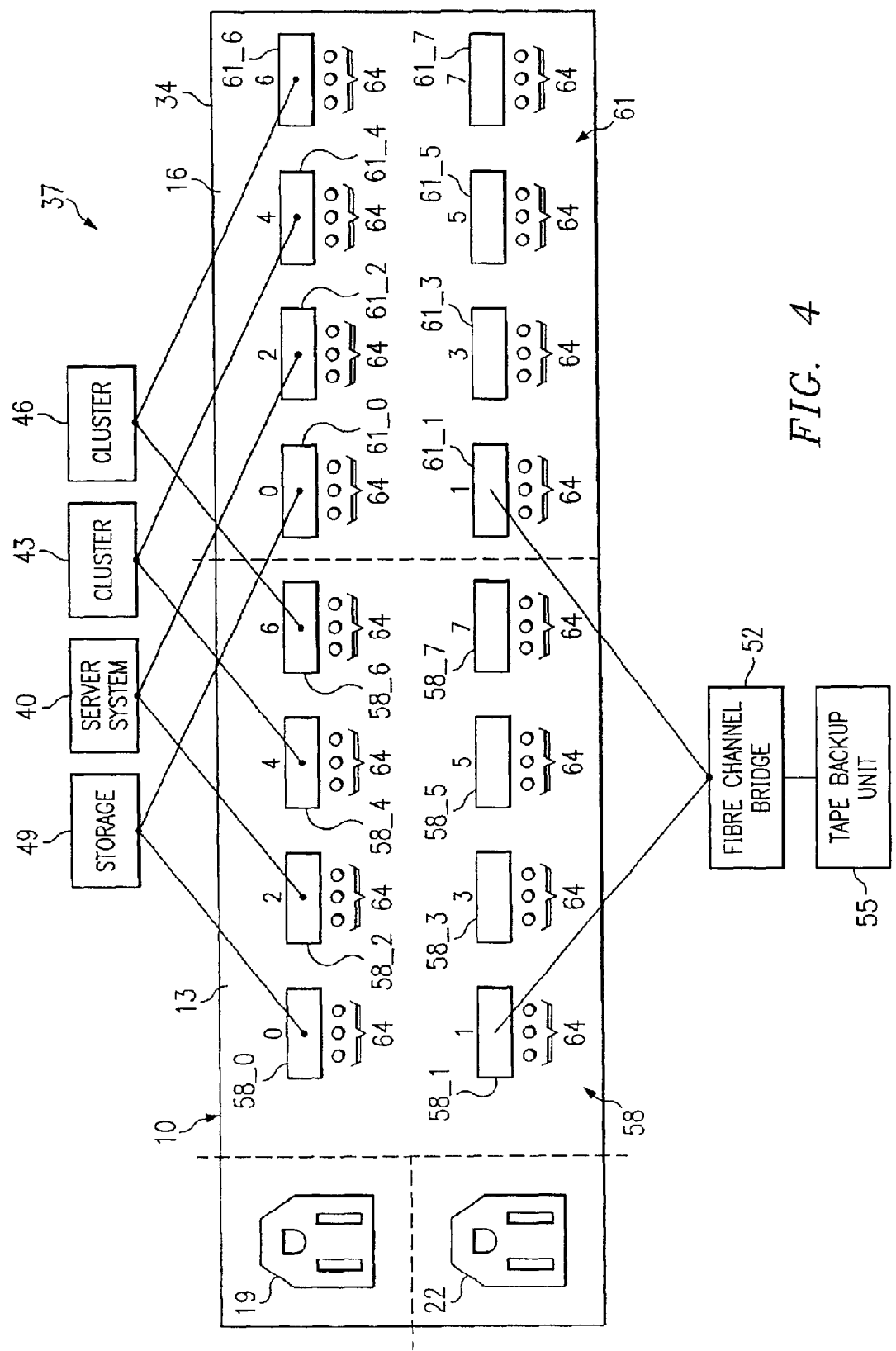
FIG. 4 illustrates a schematic drawing showing a computer network incorporating teachings of the present disclosure.

FIG. 4 illustrates a schematic drawing depicting a computer network or system incorporating teachings of the present disclosure. According to teachings of the present disclosure, switching appliance 10 may be employed to communicatively couple a plurality of computing components into a computer network such as computer network 37. Computing components which may be coupled to switching appliance 10 include, but are not limited to, personal computers, server systems, server clusters, other networks, storage devices, Fibre Channel to SCSI bridges, tape backup units, tape libraries, printers as well as other devices.

As illustrated in FIG. 4, switching appliance 10 may be implemented in a 1U chassis, such as 1U chassis 34. In the embodiment depicted in FIG. 4, switching appliance 10 preferably includes switch module 13 and switch module 16. In addition, switching appliance 10 preferably includes power supply 19 and power supply 22. By providing two separate communication paths between computing components, a failure in one switch will generally not affect the communications path through the second, redundant switch.

A management module, such as management module 25 of FIG. 1, is also preferably included in the embodiment of switching appliance 10 depicted in FIG. 4. Such a management module is preferably internal to 1U chassis 34 and may be implemented, at least in part, in a program of instructions or software stored in one or more memory units and executed by one or more processors. Both the memory units and the processors are preferably incorporated into switching appliance 10. In another aspect, at least a portion of the functionalities of management module 25 may be hardwired into one or more management module subsystems (not expressly shown).

Also preferably included on switching appliance 10 are a plurality of ports 58 associated with switch module 13 and a plurality of ports 61 associated with switch module 16. Ports 5B and 61 are preferably operable to communicatively couple switching appliance 10 with one or more computing components. Switching appliance 10 preferably includes at least two switch modules having the same number of ports.

Generally, each of ports 58 and 61 is assigned a number beginning at zero (0) up to the total number of ports on a given switch module minus one (1) (e.g., where 'n' equals the total number of ports, the highest number assigned to a port will be n–1). As described herein, ports 58 and 61 of switch modules 13 and 16 respectively, may be identified by "58_(port number)" or "61_(port number)." For example, in this identification system, port 58_2 indicates port two (2) of ports 58 preferably included on switch module 13.

Preferably disposed proximate each of ports 58 and ports 61 are LEDs 64. LEDs 64 may be used to indicate cabling connections to be made between switching appliance 10 and one or more computing components. LEDs 64 may also be used to indicate the operability of an associated port. In an alternate aspect, one or more LEDs 64 may be included on front bezel 29 of switching appliance 10 to aid a user in making the necessary cabling connections. Further detail regarding the use of LEDs 64 as a cabling connection aid is Included below.

As illustrated in FIG. 4, computer network 37 includes server system 40, cluster 43 and cluster 46. In addition, computer network 37 includes storage device 49 and Fibre Channel-to-SCSI bridge 52. Fibre Channel-to-SCSI bridge 52 may be employed to couple tape backup unit 55 to switching appliance 10. Alternate configurations of computer network 37 are considered within the scope of the present disclosure.

In the cabling connection configuration depicted in FIG. 4, switching appliance 10 may be port-zoned in a variety of differing manners. For example, computer network 37 in FIG. 4 may be port-zoned to include three overlapping zones. In such a configuration, a first zone might include ports 58__0, 58__1 and 58__2 as one communication path and ports 61__0, 61__1 and 61__2 as a second, redundant communication path. A second zone might include ports 58__0, 58__1 and 58__4 as one communication path and ports 61__0, 61__1 and 61__4 as a second, redundant communication path. A third zone might include ports 58__0, 58__1 and 58__6 as one communication path and ports 61__0, 61__1 and 61__6 as a second, redundant communication path. As mentioned above, by communicatively coupling the computing components in each zone through a first and a second set of ports, the computing components included in each zone are provided with a redundant communication path or connection which thereby generally increases computing component and computer network 37 availability.

In the configuration described above, the ports contained in the overlapping zones include ports 58__0, 61__0, 58__1 and 61__1. Consequently, storage device 49 may be shared, i.e., accessed and seen, by all three zones just as Fibre Channel-to-SCSI bridge 52 may be shared by all three zones. In contrast, server system 40 and clusters 43 and 46, in the port-zoning configuration described above, are unable to see one another, but may see and access storage device 49 as well as Fibre Channel-to-SCSI bridge 52. Alternate port-zoning configurations are considered within the spirit and scope of the present disclosure. Limitations on port-zoning options are directly correlated with the number of ports 58 and 61 included on switch modules 13 and 16 respectively.

As mentioned above, in one aspect of the present disclosure, LEDs 64 may be used as an aid to the cabling connections required for switching appliance 10 to properly perform its communication functions. In an embodiment of switching appliance 10 having available port-zoning options which include three zones, three LEDs 64 may be associated with each of ports 58 and 61. If a particular port belongs to zone one, for example, the first LED 64 associated with that particular port may be illuminated to indicate that the computing components whose cables are or are to be connected to the ports associated with the illuminated LEDs 64 are in the same zone. To indicate the required cabling connections to be made to ports in overlapping zones, for example, all three LEDs 64 may be illuminated. Alternatively, for example, colored LEDs 64 may be employed such that all ports in zone one are indicated by green LEDs 64, ports in zone two by red LEDs 64 and ports in zone three by yellow LEDs 64. LEDs 64 blinking at different frequencies, illuminated at different times, as well as other methods may also be employed to indicate required cable connections. As mentioned above, one or more LEDs may be included proximate user selection mechanism 28 or front bezel 29 to aid users in completing the appropriate cabling connections.

Although the disclosed embodiments have been described in detail, it should be understood that various changes, substitutions and alterations can be made to the embodiments without departing from their spirit and scope.

What is claimed is:

1. A networking device for use in computer networks comprising:

two switch modules; each switch module having a plurality of ports operable to couple together a plurality of computing components;

two power supplies operably coupled to each switch module;

a user-operable selector operably coupled to the switch modules; and the selector operable to configure the plurality of ports into one of at least two port-zoning configurations in response to operation of the selector by a user and to indicate a plurality of cabling connections to be made between the plurality of ports and the plurality of computing components.

2. The networking device of claim 1 further comprising each power supply operable to power the switch modules.

3. The networking device of claim 1 further comprising the user selection mechanism operable to configure each switch module according to a user selected port-zoning configuration.

4. The networking device of claim 1 further comprising a 1U chassis enclosing the switch modules, the power supplies and the user selection mechanism.

5. The networking device of claim 1 further comprising hot-pluggable switch modules.

6. The networking device of claim 1 further comprising hot-pluggable power supplies.

7. The networking device of claim 1 further comprising Fibre Channel switch modules.

8. The networking device of claim 1 further comprising a port-zoning configuration confirmation mechanism operable to confirm a port-zoning configuration selected with the user selection mechanism.

9. The networking device of claim 1 further comprising:

a plurality of LEDs operably associated with the plurality of ports; and the LEDs operable to indicate at least one cabling connection to be made between the plurality of ports and the plurality of computing components in response to a port-zoning configuration selected with the user selection mechanism.

10. The networking device of claim 1 further comprising:

at least one processor and at least one memory operably coupled to the switch modules;

a program of instructions storable in the memory and executable in the processor; and the program of instructions operable to assign zone to the plurality of ports in response to selection of a port-zoning configuration.

11. A method for communicatively coupling a plurality of computing components comprising:

providing at least two switch modules, each switch module having a plurality of ports operable to communicatively couple the plurality of computing components;

providing a user-operable selector operably coupled to the switch modules;

maintaining a program of instructions operable to configure the plurality of ports into one of at least two port-zoning configurations in response to operation of the selector and to indicate a plurality of cabling connections to be made between the plurality of ports and the plurality of computing components; and selecting one of the at least two port-zoning configurations according to the program of instructions.

12. The method of claim 11 further comprising confirming the port-zoning configuration selected with the user selection mechanism.

13. The method of claim 11 further comprising activating a plurality of LEDs associated with the plurality of ports to indicate at least one cabling connection to be made in accordance with the port-zoning configuration selected with the user selection mechanism.

14. The method of claim 11 further comprising configuring each switch module according to a selected port-zoning configuration.

15. A computing system comprising:

a plurality of computing components;

a switching appliance operably coupled to the plurality of computing components;

the switching appliance having a plurality of switch modules, a power source operably coupled to the switch modules, a plurality of ports operably coupled to the switch modules and the plurality of computing components, at least one processor, at least one memory and a program of instructions executable by the processor and storable in the memory;

the switching appliance further including a user-operable selector operably coupled to the switch modules;

the program of instructions operable to configure the plurality of ports according to a user selected port-zoning configuration selected from a plurality of pre-programmed port-zoning configurations based on input from the user-operable selector; and the program of instructions operable to indicate a plurality of cabling connections to be made between the plurality of ports and the plurality of computing components.

16. The computing system of claim 15 further comprising:

the power source including at least one power supply operably coupled to each switch module; and each power supply operable to provide power to the plurality of switch modules.

17. The computing system of claim 15 further comprising the power source having a power supply paralleling backplane.

18. The computing system of claim 15 further comprising:

a port-zoning configuration confirmation mechanism operably coupled to the user selection mechanism; and the port-zoning configuration confirmation mechanism operable to confirm configuration of the plurality of ports by the program of instructions.

19. The computing system of claim 15 further comprising the program of instructions operable to illuminate LEDs associated with the plurality of ports to indicate the cabling connections to be made.

20. The computing system of claim 15 further comprising the program of instructions operable to generate a map of the cabling connections to be made between the plurality of ports and the plurality of computing components.

21. The computing system of claim 15 further comprising the program of instructions operable to configure the plurality of ports coupled to each switch module according to a port-zoning configuration selected with the user selection mechanism.

22. The computing system of claim 15 further comprising Fibre Channel switch modules.

23. The computing system of claim 15 further comprising: hot-pluggable switch modules; and a hot-pluggable power source.

24. A switching appliance comprising:

a plurality of Fibre Channel switch modules;

each Fibre Channel switch module having a plurality of ports;

a plurality of power supplies operably coupled to the plurality of Fibre Channel switch modules;

each power supply operable to power the plurality of Fibre Channel switch modules;

at least one processor and at least one memory operably coupled to the Fibre Channel switch modules and the power supplies;

a program of instructions storable in the memory and executable in the processor;

the program of instructions operable to configure the ports of each Fibre Channel switch module into a plurality of port-zoning configurations;

the program of instructions operable to indicate a plurality of cabling connections to be made between the plurality of ports and a plurality of associated computing components a user-operable selector operably coupled to the Fibre Channel switch modules and the processor; and the user-operable selector operable to select one of the plurality of port-zoning configurations and to initiate the program of instructions such that the ports on each Fibre Channel switch module are configured according to the selected port-zoning configuration.

25. The switching appliance of claim 24 further comprising hot-pluggable Fibre Channel switch modules and hot pluggable power supplies.

26. The switching appliance of claim 24 further comprising the program of instructions operable to generate at least one cable connection indicator associated with the plurality of ports.

27. A computer network comprising:

a plurality of computing components;

a switching appliance communicatively coupled with the plurality of computing components;

the switching appliance having two hot-pluggable switch modules, each switch module having a plurality of ports, two hot-pluggable power supplies operably coupled to the two switch modules, a user selection mechanism operably coupled to the switch modules, the user selection mechanism operable to select one of a plurality of port-zoning configurations, a port-zoning configuration confirmation mechanism operably coupled to the user selection mechanism, the port-zoning configuration confirmation mechanism operable to initiate a program of instructions in response to confirmation of the selected port-zoning configuration, and the program of instructions operable to configure the ports of the switch modules according to the selected port-zoning configuration.

28. The computer network of claim 27 further comprising:

a plurality of LEDs operably coupled to the plurality of ports; and the program of instructions operable to illuminate the LEDs such that the plurality of computing components may be communicatively coupled with the switching appliance according to the selected port-zoning configuration.

* * * * *